US011306826B2

(12) United States Patent
Magladry (10) Patent No.: US 11,306,826 B2
(45) Date of Patent: Apr. 19, 2022

(54) SLIDE GATE WITH REINFORCEMENT RIBS (71) Applicant: Mueller International, LLC, Atlanta, GA (US)

(72) Inventor: Spencer Magladry, Englewood, CO (US)

(73) Assignee: Mueller International, LLC, Atlanta, GA (US)

( * ) Notice: Subject to any disclaimer, the term of this patent is extended or adjusted under 35 U.S.C. 154(b) by 14 days.

(21) Appl. No.: 16/856,192

(22) Filed: Apr. 23, 2020

(65) Prior Publication Data
US 2021/0332892 A1 Oct. 28, 2021

(51) Int. Cl.
*F16K 3/02* (2006.01)
*F16K 3/314* (2006.01)
*F16K 27/04* (2006.01)
*E02B 7/28* (2006.01)

(52) U.S. Cl.
CPC .......... *F16K 3/0218* (2013.01); *F16K 3/0281* (2013.01); *F16K 3/314* (2013.01); *F16K 27/044* (2013.01); *E02B 7/28* (2013.01)

(58) Field of Classification Search
CPC ...... F16K 3/0218; F16K 3/0281; F16K 3/314; F16K 27/044; E02B 7/28
USPC ........................................................ 251/326
See application file for complete search history.

(56) References Cited

U.S. PATENT DOCUMENTS

| 689,771 | A | * | 12/1901 | Whiting | E02B 7/28 405/103 |
| 785,134 | A | * | 3/1905 | Walker | F16K 3/0218 251/147 |
| 1,999,921 | A | * | 4/1935 | Burkhardt | F16K 27/044 138/46 |
| 2,643,521 | A | * | 6/1953 | Hatch | E02B 7/54 405/106 |
| 3,425,662 | A | * | 2/1969 | Bryant | F16K 3/0227 251/176 |
| 3,760,593 | A | * | 9/1973 | Whipps | E02B 7/28 405/106 |
| 4,028,896 | A | * | 6/1977 | Whipps | E02B 7/28 405/104 |
| 4,070,863 | A | * | 1/1978 | Brown | E02B 7/28 405/105 |
| 4,226,553 | A | * | 10/1980 | Whipps | E02B 7/54 251/328 |
| 4,265,564 | A | * | 5/1981 | Watelet | E02B 7/54 405/105 |
| 4,288,059 | A | * | 9/1981 | Gurbin | F16K 3/182 251/203 |

(Continued)

FOREIGN PATENT DOCUMENTS

| GB | 191306417 A | * | 2/1914 | .......... F16K 3/0218 |
| GB | 1471201 A | * | 4/1977 | .............. E02B 7/28 |

*Primary Examiner* — David Colon-Morales
(74) *Attorney, Agent, or Firm* — Taylor English Duma LLP (57) ABSTRACT

Example aspects of a slide gate, a slide gate assembly, and a method of using a slide gate assembly are disclosed. The slide gate can comprise a gate body defining a first face, a second face, and a sliding groove; and a plurality of reinforcement ribs extending from the second face, the reinforcement ribs comprising: an exterior rib frame; and an interior rib grid comprising an annular reinforcement rib, wherein the interior rib grid is oriented within a boundary of the exterior rib frame.

20 Claims, 5 Drawing Sheets

(56) References Cited

U.S. PATENT DOCUMENTS

| | | | | |
|---|---|---|---|---|
| 4,848,962 A | * | 7/1989 | Whipps | E02B 7/28 |
| | | | | 405/106 |
| 8,640,736 B2 | * | 2/2014 | Coscarella | F16K 3/0218 |
| | | | | 138/90 |
| 9,537,183 B2 | * | 1/2017 | Appelboom | E02B 11/00 |
| 2011/0220828 A1 | * | 9/2011 | Kennedy | F16K 3/0218 |
| | | | | 251/328 |

* cited by examiner

SLIDE GATE WITH REINFORCEMENT RIBS

TECHNICAL FIELD

This disclosure relates to water flow control. More specifically, this disclosure relates to a slide gate comprising reinforcement ribs.

BACKGROUND

Slide gates are configured to control the flow of fluid through an opening in various applications, including dams, water and sewage treatment plants, flood control projects, power plants, fish hatcheries, and the like. Slide gates typically comprise a gate body and a conventional grid pattern of intersecting horizontal and vertical reinforcement ribs extending from a rear face of the gate body. However, with the conventional grid pattern, stresses tend to concentrate at the numerous junctions between the horizontal and vertical ribs. Furthermore, the ribs are typically cast monolithically with the gate body. However, voids and other defects often develop at the numerous junctions during the casting process.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a slide gate comprising a gate body defining a first face, a second face, and a sliding groove; and a plurality of reinforcement ribs extending from the second face, the reinforcement ribs comprising: an exterior rib frame; and an interior rib grid comprising an annular reinforcement rib, wherein the interior rib grid is oriented within a boundary of the exterior rib frame.

Also disclosed is a slide gate assembly comprising a slide gate comprising a gate body, the gate body defining a first face and a second face, an annular reinforcement rib extending from the second face; and a gate frame defining a frame opening, the slide gate slidably mounted on the gate frame, wherein the slide gate is selectively movable relative to the gate frame between an open orientation, wherein fluid is permitted to flow through the frame opening, and a closed orientation, wherein fluid is restricted from flowing through the frame opening.

Also disclosed is a method of using a slide gate assembly, the method comprising providing a slide gate assembly, the slide gate assembly comprising a slide gate slidably mounted to a gate frame, the slide gate comprising an inner annular rib and an outer annular rib; and moving the slide gate relative to the gate frame between an open orientation, wherein fluid is permitted to flow through a frame opening of the gate frame, and a closed orientation, wherein fluid is restricted from flowing through the opening Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a slide gate and associated methods, systems, devices, and various apparatus. Example aspects of the slide gate can comprise a gate body defining a first face and a second face. The second face can comprise reinforcement ribs. In some aspects, at least one of the reinforcement ribs can be circular in shape. It would be understood by one of skill in the art that the slide gate is described in but a few exemplary embodiments among many. No particular terminology or description should be considered limiting on the disclosure or the scope of any claims issuing therefrom.

Figure 1A:
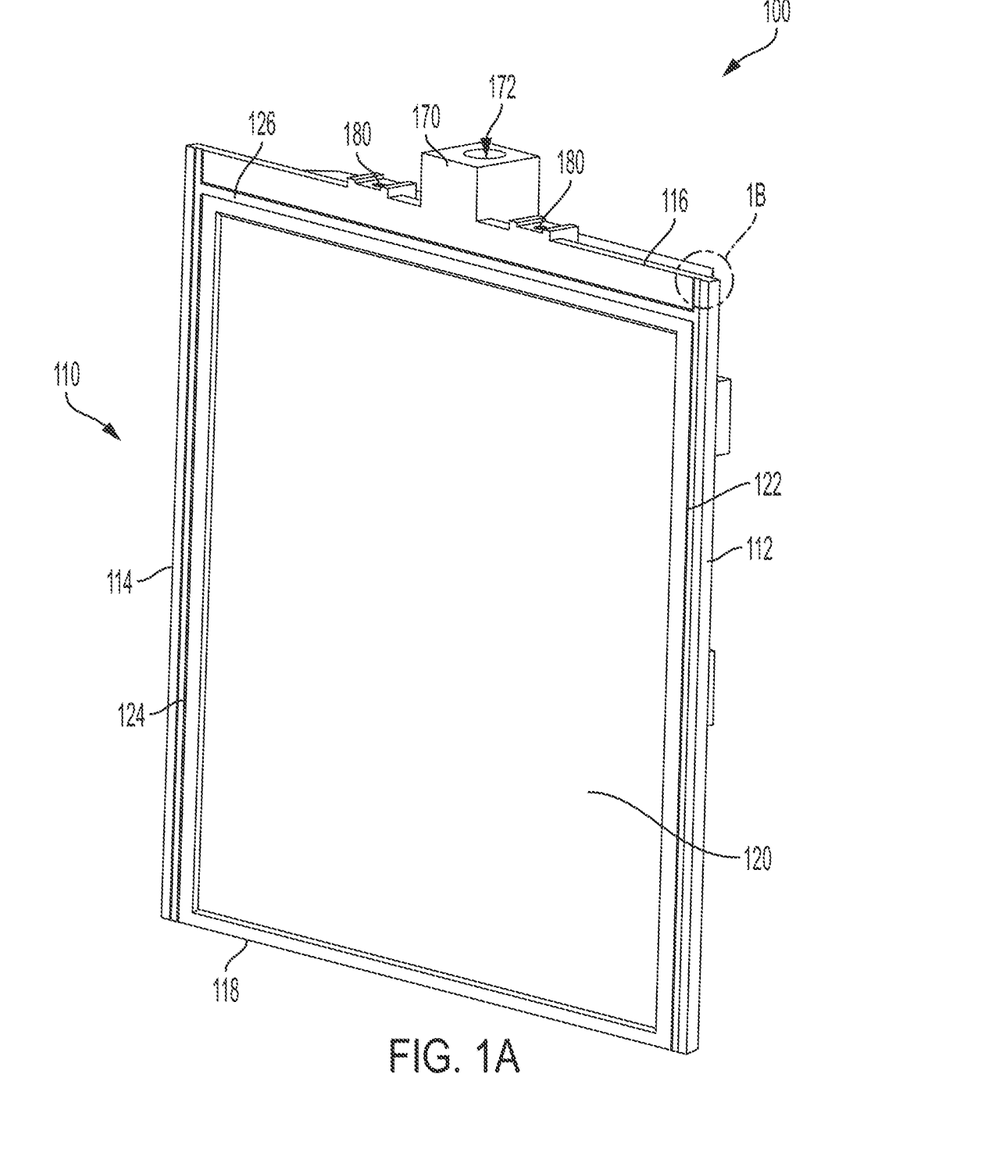
FIG. 1A is a rear perspective view of a slide gate, in accordance with one aspect of the present disclosure.

FIG. 1A is a rear perspective view of a slide gate 100, in accordance with one aspect of the present disclosure. The slide gate 100 can be mounted to a gate frame 510 (shown in FIG. 5) and can be used to control the flow of fluid through a frame opening 610 (shown in FIG. 6) in various applications, including, but not limited to, dams, water and sewage treatment plants, flood control projects, power plants, fish hatcheries, and the like. As shown, the slide gate 100 can define a gate body 110. The gate body 110 can define a first face 120 and an opposite second face 230 (shown in FIG. 2), and can define a substantially square or rectangular shape in some aspects. The gate body 110 can further define a first lateral end 112, a second lateral end 114 opposite the first lateral end 112, an upper end 116, and a lower end 118 opposite the upper end 116. For example, the first lateral end 112 can be a right end, the second lateral end 114 can be a left end, relative to the orientation shown. In the present aspect, the first face 120 of the gate body 110 can be substantially planar, as shown. Example aspects of the slide gate 100 can be formed from a metal material, such as, for example, iron, and more specifically, cast iron. For example, the slide gate 100 may be cast from grey iron or ductile iron in some aspects. However, in other aspects, the slide gate 100 can comprise any other suitable material known in the art, including but not limited to, other metal materials, such as aluminum and steel, plastic materials, composite materials, and the like.

Figure 5:
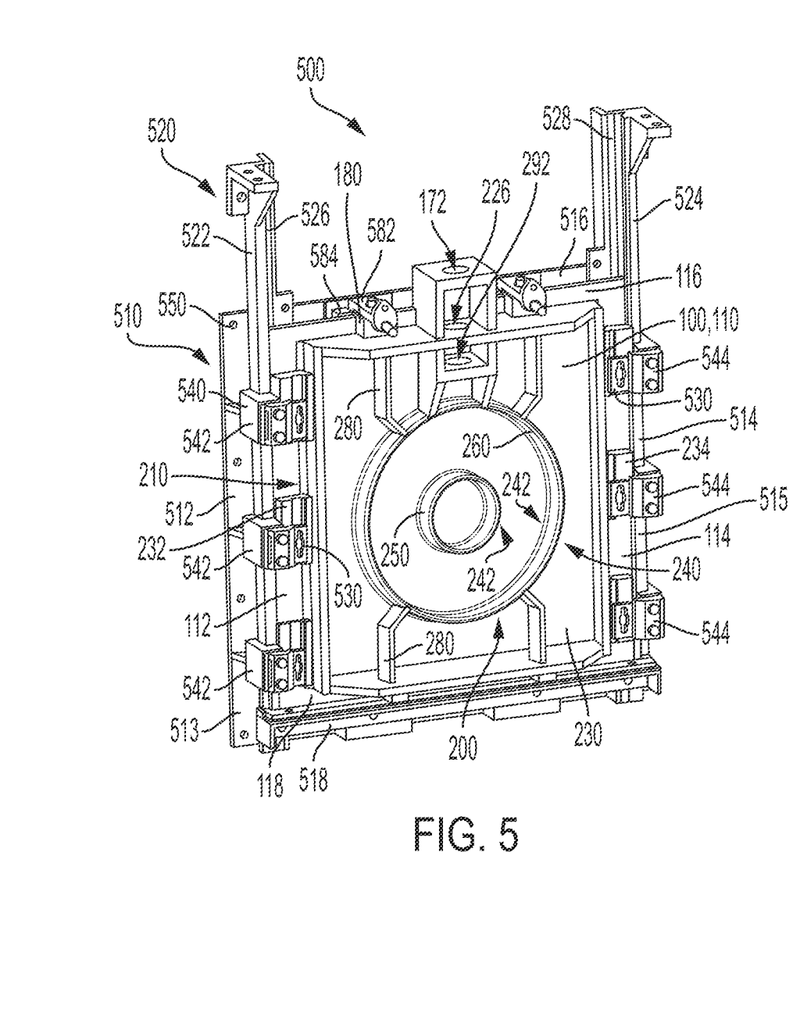
FIG. 5 is a front perspective view of a slide gate assembly comprising the slide gate of FIG. 1A and a gate frame, wherein the slide is in a closed orientation.
Figure 6:
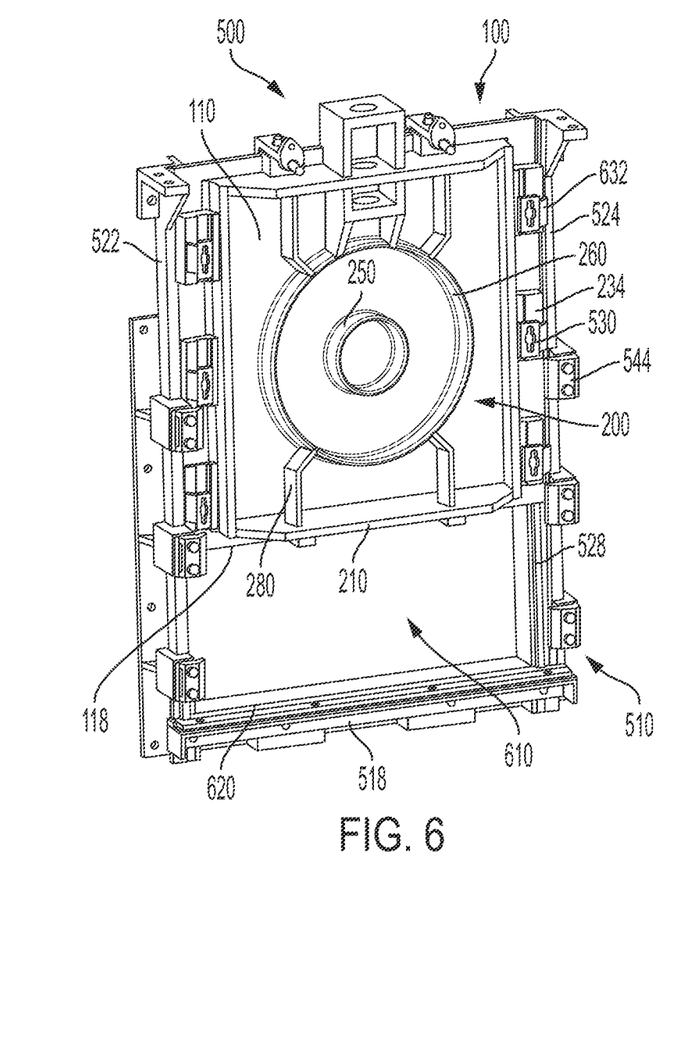
FIG. 6 is a front perspective view of the slide gate assembly of FIG. 5, wherein the slide gate of FIG. 1A in an open orientation.

As shown, according to example aspects, the gate body 110 can define a stem block, such as an upper stem block 170 at the upper end 116 thereof. The upper stem block 170 can be substantially centered at the upper end 116. Example aspects of the upper stem block 170 can define a stem opening, such as an upper stem opening 172, configured to receive a stem (not shown) therethrough. The stem can be configured to lower and raise the slide gate 100 between a closed orientation, as shown in FIG. 5, and an open orientation, as shown in FIG. 6. In the closed orientation, fluid can be restricted from flowing through the frame opening 610, and in the open orientation, fluid can be permitted to flow through the frame opening 610. The stem can be manually driven, electronically driven, or driven by any other suitable driving means known in the art. Example aspects of the gate body 110 can further define a pair of upper wedge pads 180, wherein each of the upper wedge pads 180 can be oriented on an opposing side of the upper stem block 170, as shown. Each of the upper wedge pads 180 can be configured to support an upper wedge hook 582 (shown in FIG. 5 and described in further detail below). The upper stem block 170 and/or the upper wedge pads 180 can be cast monolithically with the gate body 110 or can be formed separately and attached thereto.

Figure 1B:
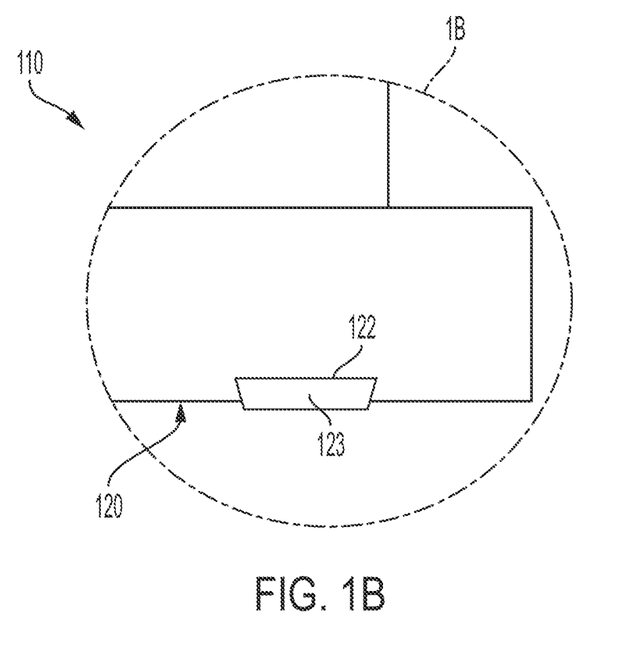
FIG. 1B is a top view of detail 1B taken from FIG. 1A.

Example aspects of the gate body 110 can define an elongated sliding groove, such as a first dovetail groove 122. According to example aspects, a material, such as bronze, for example and without limitation, can be impacted into the first dovetail groove 122 to define a first gate body seating face 123 (shown in FIG. 1B) of the gate body 110. In the present aspects, the first dovetail groove 122 can be formed in the first face 120, wherein the first dovetail groove 122 can extend in a substantially vertical direction, relative to the orientation shown, proximate to the first lateral end 112 of the gate body 110. Some example aspects of the gate body 110 can further define a second elongated sliding groove, such as a second dovetail groove 124, wherein a material, such as, for example, bronze, can be impacted therein to define a second gate body seating face (not shown), which can be substantially similar to the first gate body seating face 123. The second dovetail groove 124 can be formed in the first face 120 and can extend in a substantially vertical direction proximate to the second lateral end 114 of the gate body 110. Each of the first gate body seating face 123 and second gate body seating face can be configured to slidably engage first and second gate frame seating faces 526,528 (shown in FIG. 5), respectively of the gate frame 510, to seal the gate body 110 with the gate frame 510 and to allow the slide gate 100 to slide between the open and closed orientations relative to the gate frame 510. In other aspects, the gate body 110 and gate frame 510 can define any other suitable sliding connection means known in the art. Furthermore, other aspects of the gate body 110 can define more or fewer gate body seating faces configured to engage more or fewer corresponding gate frame seating faces. For example, as shown, in some aspects, the gate body 110 can further define an upper dovetail groove 126 proximate to the upper end 116 thereof. Similar to the first and second dovetail grooves 122,124, a material, such as bronze, can be impacted into the upper dovetail groove 126 to define an upper gate body seating face (not shown). The upper gate body seating face can be configured to engage a corresponding upper gate frame seating face (not shown) of the gate frame 510 to further seal the gate body 110 with the gate frame 510 in the closed orientation.

Figure 2:
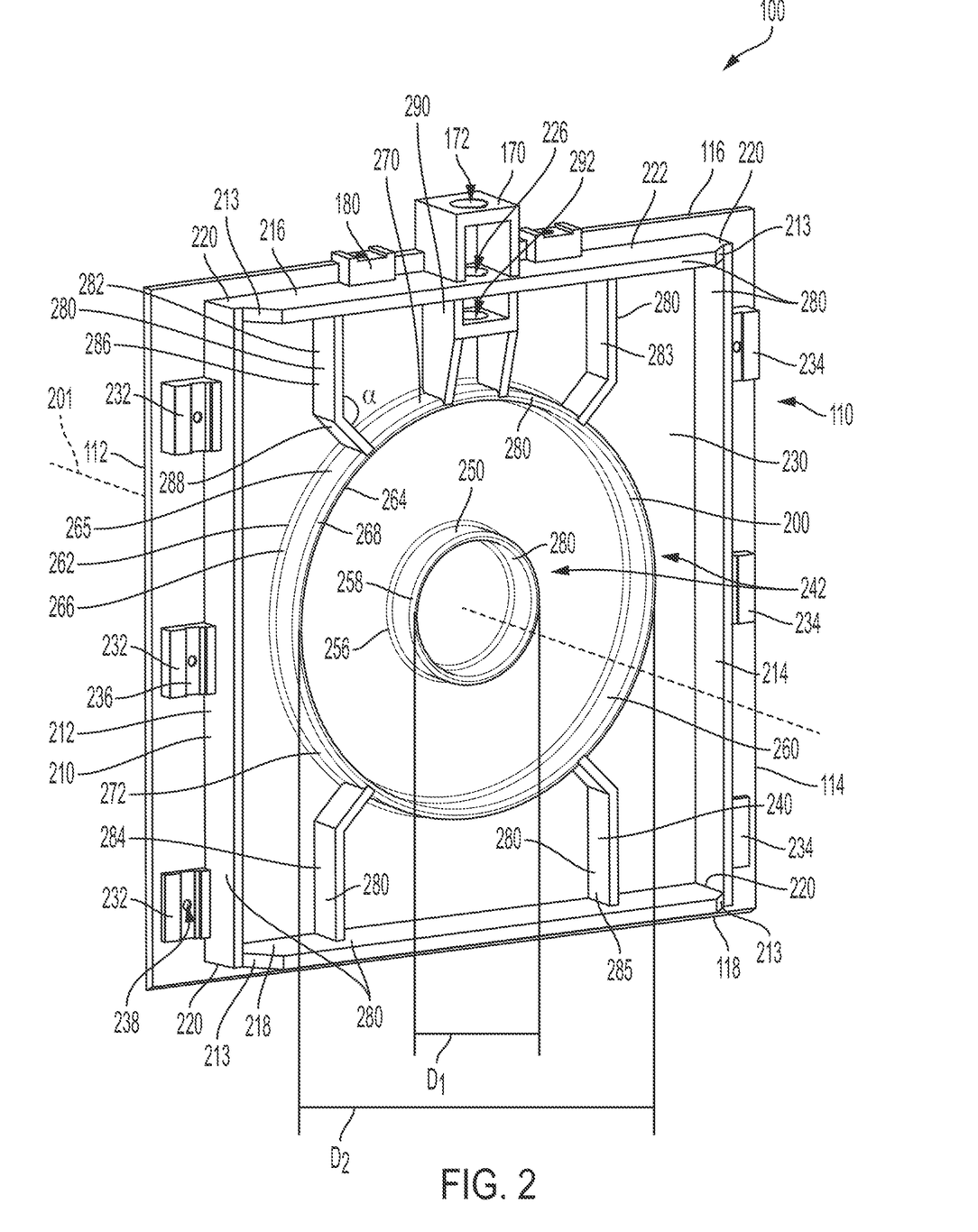
FIG. 2 is a front perspective view of the slide gate of FIG. 1A.

FIG. 2 illustrates a front perspective view of the slide gate 100, showing the second face 230 thereof. According to example aspects, a plurality of reinforcement ribs 200 can extend from the second face 230 of the slide gate 100. The reinforcement ribs 200 can be cast monolithically with the gate body 110 in the present aspect; however, in other aspects, the reinforcement ribs 200 may be formed separately and attached to the second face 230. Each of the reinforcement ribs 200 can extend from the second face 230 in a direction that can be about perpendicular to the second face 230, as shown; although, in other aspects, the reinforcement ribs 200 may not be perpendicular to the second face 230. The reinforcement ribs 200 can be configured to provide reinforcement to the gate body 110 of the slide gate 100. For example, in use, fluid, such as water, can apply pressure to the first face 120 of the gate body 110, and the reinforcement ribs 200 can serve to disperse the pressure across the gate body 110 and to minimize and/or locate deflection of the gate body 110, as needed. In the present aspect, the reinforcement ribs 200 can define an exterior rib frame 210 and an interior rib grid 240. The exterior rib frame 210 can comprise a substantially vertical first side rib 212 oriented proximate to the first lateral end 112 of the gate body 110 and a substantially vertical second side rib 214 oriented proximate to the second lateral end 114 of the gate body 110. The exterior rib frame 210 can further comprise a substantially horizontal first end rib 216 oriented proximate to the upper end 116 of the gate body 110 and a substantially horizontal second end rib 218 oriented proximate to the lower end 118 of the gate body 110. In example aspects, each of the first and second side ribs 212,214 and first and second end ribs 216,218 can be connected at adjacent ends thereof to define four corners 220 of the exterior rib frame 210. As such, the exterior rib frame 210 can define a substantially square or rectangular shape, as shown. For example, in the present aspect, each of the first and second side ribs 212,214 can define a length that can be greater than a length of each of the first and second end ribs 216,218 to define a substantially rectangular shape. Moreover, in some aspects, some or all of the reinforcement ribs 200 of the exterior rib frame 210 can define a chamfer 213 at the corresponding corners 220. For example, as shown, in the present aspect, each of the first and second end ribs 216,218 can define a chamfer 213 at the corresponding corners 220.

According to example aspects, the interior rib grid 240 can be oriented within a boundary of the exterior rib frame 210. As shown, the interior rib grid 240 can define one or more annular reinforcement ribs 242, for example, an inner annular rib 250 and an outer annular rib 260. The inner annular rib 250 can define an inner annular rib 250 diameter $D_1$ than can be smaller than an outer annular rib 260 diameter $D_2$ of the outer annular rib 260. As such, as shown, the inner annular rib 250 can be oriented within a boundary of the outer annular rib 260. Each of the inner annular rib 250 and outer annular rib 260 can be about concentric to a center axis 201 of the gate body 110, and thus, can be concentric to one another. In some aspects, such as the present aspect, the outer annular rib 260 can define a general thickness that can be greater than a general thickness of the inner annular rib 250. In example aspects, as shown, the outer annular rib 260 can define a proximal end 262 joined with the second face 230 of the gate body 110, a distal end 264 opposite the proximal end 262, and a central portion 265 therebetween. Each of the proximal end 262 and distal end 264 can be substantially rounded or filleted in some aspects, as shown. Furthermore, as shown, the inner annular rib 250 can be similarly formed to define a filleted proximal end 256 and a filleted distal end 258 Other aspects of the interior rib grid 240 can define more or fewer annular reinforcement ribs 242 as needed, dependent upon a variety of factors, including, but not limited to, the size of the slide gate 100 and/or the amount of pressure applied thereto.

As shown, in some example aspects, the inner annular rib 250 can be a floating rib, wherein the inner annular rib 250 is not connected to any of the other reinforcement ribs 200, including the outer annular rib 260, and does not comprise any junctions. As such, a space between the inner annular rib 250 and outer annular rib 260 can be considered an unreinforced space. According to some example aspects, it may be desired to have no more than about 24" of unreinforced space between the inner annular rib 250 and outer annular rib 260. For example, in a particular aspect, the inner annular rib 250 can define a diameter $D_1$ of about 10" and the outer annular rib 260 can define a diameter $D_2$ of about 30". As described above, the inner and outer annular ribs 250,260 can concentric to one another, and as such, the outer annular rib 260 is no further than about 10" from any point around a circumference of the inner annular rib 250. In such an aspect, the gate body 110 may define a length of about 48" and a height of about 48", for example. In another example aspect, wherein the gate body 110 can define larger dimensions, the inner annular rib 250 can define a diameter $D_1$ of about 24" and the outer annular rib 260 can define a diameter $D_2$ of about 72". As such, the outer annular rib 260 can be no further than about 24" from any point around the circumference of the inner annular rib 250. In other aspects, the gate body 110 can define any suitable dimensions, and each of the inner and outer annular ribs 250,260 can define any suitable diameter. In some aspects, there may be more than 24" of unreinforced space between the inner and outer annular ribs 250,260.

As shown, the interior rib grid 240 can further comprise a plurality of connector ribs 280. Each of the connector ribs 280 can extend from the exterior rib frame 210 to the outer annular rib 260. In the present aspect, the connector ribs 280 can comprise a left upper connector rib 282 and a right upper connector rib 283, relative to the orientation shown, each of which can extend from the first end rib 216 of exterior rib frame 210 to an upper portion 270 of the outer annular rib 260. The connector ribs 280 can further comprise a left lower connector rib 284 and right lower connector rib 285, relative to the orientation shown, each of which can extend from the second end rib 218 of the exterior rib frame 210 to a lower portion 272 of the outer annular rib 260. Other aspects of the invention can comprise more or fewer connector ribs 280, as needed to sufficiently reinforce the gate body 110 of the slide gate 100. As shown, in the present aspect, each of the connector ribs 280 can define an outer rib segment 286 and an inner rib segment 288 connected to the outer rib segment 286. Each of the corresponding outer rib segments 286 and inner rib segments 288 can be substantially linear and can be oriented at an angle α relative to one another. For example, each inner rib segment 288 can be oriented at an obtuse angle α relative to the corresponding outer rib segment 286. In the present aspect, each of the outer rib segments 286 can extend in a substantially vertical direction, relative to the orientation shown, and each inner rib segments 288 can extend substantially radially inward from the corresponding outer rib segment 286, relative to the center axis 201. Furthermore, in the present aspect, each outer rib segment 286 can define a length that can be greater than a length of the corresponding inner rib segment 288. However, in other aspects, any or all of the connector ribs 280 can be configured differently; for example, the connector ribs 280 can define any other suitable size, shape, or orientation.

According to example aspects, fluid pressure on the gate body 110 in the closed orientation can exert stresses (e.g., bending moments) on the gate body 110 and can cause the gate body 110 to deflect. Providing the exterior rib frame 210 can serve to reinforce the gate body 110 proximate to the outer edges thereof (i.e., the first lateral end 112, second lateral end 114, upper end 116, and lower end 118), which can reduce deflection of the gate body 110 proximate to the outer edges. It can be particularly beneficial to reduce the deflection of the gate body 110 at and around first side wedge pads 232 and second side wedge pads 234, which are located proximate to the first lateral end 112 and second lateral end 114, respectively, as described in further detail below. Furthermore, in the present aspect, anchoring the outer annular rib 260 to the exterior rib frame 210 with the connector ribs 280 can provide added reinforcement to the areas around and between the outer annular rib 260 and the exterior rib frame 210. As such, the gate body 110 can define a substantially reinforced space outside of the outer annular rib 260. Moreover, as described above, in some example aspects, the inner annular rib 250 can be a floating rib, wherein the inner annular rib 250 is not connected to any of the other reinforcement ribs 200, including the outer annular rib 260 and the exterior rib frame 210. This can allow the gate body 110 to deflect more at the unreinforced space within and around the inner annular rib 250, while the reinforced space outside of the outer annular ring (i.e., reinforced space) can undergo minimal deflection. According to some example aspects, the spacing between the annular reinforcement ribs 242 can determine the amount of deflection allowed between the annular reinforcement ribs 242 and at and around the center of the gate body 110. Additionally, the circular geometry of the annular reinforcement ribs 242, which in the present aspect can comprise the inner and outer annular ribs 250,260, can provide a smooth, continuous surface for stresses on the gate body 110 to disperse across, helping to prevent stress from concentrating in a particular area or areas, such as, for example, at a center of the gate body 110.

As described above, according to example aspects, the slide gate 100 can be subjected to bending moments, resulting in the deflection of the gate body 110. Referring to the equation below, D is the flexural rigidity of the gate body 110, v is Poisson's ratio, and x and y represent coordinates on a neutral plane of the gate body 110, respectively. In an instance wherein all of the bending moments (Mo) are equal, the deflection w can define a spherical shape, a cross-section of which is a circle. As such, the deflection of the gate body 110 can generally define a circular shape. In other aspects, wherein the bending moments may not be equal, the deflection of the gate body 110 can define an elliptical shape. As such, the circular geometry of the annular reinforcement ribs 242 can better complement and provide improved reinforcement of the gate body 110 against such elliptical or circular deflection, as compared to rib geometries defining alternative shapes, such as a square grid pattern.

$$w = \frac{M_o}{2D(1+v)}(x^2 + y^2)$$

According to example aspects, the upper stem block 170 can extend generally upward from an outer rib surface 222 of the first end rib 216, relative to the orientation shown. A rib stem opening 226 can be formed in the first end rib 216, and can be aligned with the upper stem opening 172, as shown. Furthermore, a lower stem block 290 can extend from the second face 230 of gate body 110 between an inner rib surface 324 (shown in FIG. 3) of the first end rib 216 and the outer annular rib 260. A lower stem opening 292 can be formed through the lower stem block 290 and can be substantially aligned with the upper stem opening 172 and rib stem opening 226, such that the stem can extend through each of the upper stem opening 172, rib stem opening 226, and lower stem opening 292. In some aspects, the stem can define external threading configured to matingly engage internal threading formed in each of the upper, rib, and lower stem openings 172, 226, 292.

Example aspects of the slide gate 100 can further comprise one or more first side wedge pads 232 and one or more second side wedge pads 234. As shown, in the present aspect, the slide gate 100 can comprise three first side wedge pads 232 coupled to the second face 230 of the slide gate 100 proximate to the first lateral end 112 of the gate body 110 and three second side wedge pads 234 coupled to the second face 230 proximate to the second lateral end 114 of the gate body 110. The first side wedge pads 232 and/or the second side wedge pads 234 can be cast monolithically with the gate body 110 or can be formed separately and attached thereto. Other aspects can comprise more or fewer first side wedge pads 232 and second side wedge pads 234, as needed. Each of the first side wedge pads 232 and second side wedge pads 234 can be vertically spaced along the second face 230, as shown. In the present aspect, each of the first side wedge pads 232 can be oriented between the first lateral end 112 of the gate body 110 and the first side rib 212, and each of the second side wedge pads 234 can be oriented between the second lateral end 114 of the gate body 110 and the second side rib 214. In some aspects, as shown, each of the first and second side wedge pads 232,234 can define a substantially vertical slot 236 extending across a length thereof. Each first and second side wedge pad 232,234 can further define a wedge pad fastener hole 238 formed therethrough at the corresponding vertical slot 236, wherein the wedge pad fastener hole 238 can be configured to receive a wedge fastener for mounting a gate wedge 530 (shown in FIG. 5) to each of the first and second side wedge pads 232,234. Each of the gate wedges 530 can define a gate wedge face 632 (shown in FIG. 6) configured to abut a corresponding frame wedge face (not shown) of a frame wedge block 540 (shown in FIG. 5) of the gate frame 510. According to some example aspects, the gate wedge faces 632 and frame wedge faces can comprise a bronze material. In other aspects, the gate wedge faces 632 and frame wedge faces can define any other suitable material known in the art. It can be critical to prevent deflection of the gate wedge faces 632 and frame wedge faces, and the reinforcement ribs 200 can provide the desired reinforcement to the corresponding first and second sides 112,114 of the gate body 110 where the gate and frame wedge faces are located. In particular, as described above, the exterior rib frame 210, the connector ribs 280, and the outer annular rib 260 can aid in minimizing deflection at the outer edges of the gate body 110, while the floating inner annular rib 250 can allow for deflection to occur at and around the center of the gate body 110.

Figure 3:
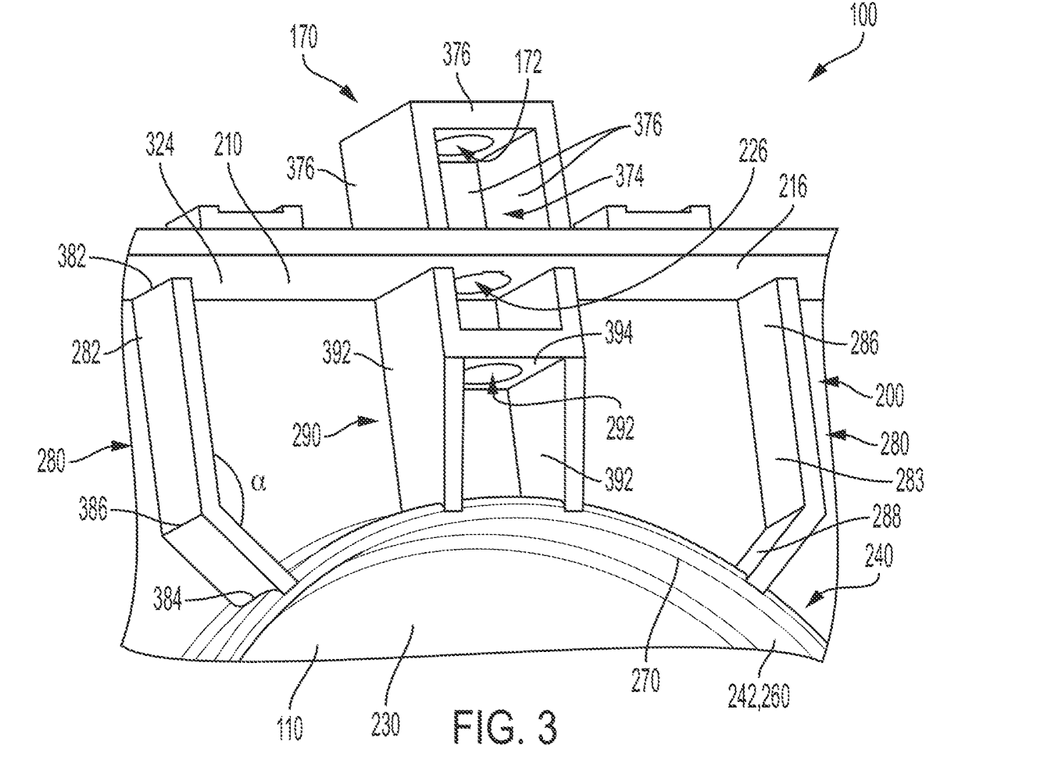
FIG. 3 is a perspective view of a pair of connector ribs of the slide gate of FIG. 1A.

FIG. 3 illustrates the left and right upper connector ribs 282,283 extending between the first end rib 216 and the upper portion 270 of the outer annular rib 260, as described. As shown, each of the connector ribs 280 can define the outer rib segment 286 and the inner rib segment 288. Referring specifically to the left and right upper connector ribs 282,283 shown in the present FIG. 3, the outer rib segment 286 of each rib 282,283 can be coupled to the inner rib surface 324 of the first end rib 216 at a first junction 382, and the inner rib segment 288 of each rib 282,283 can be coupled to the upper portion 270 of the outer annular rib 260 at a second junction 384. Each of the first junction 382 and second junction 384 can be a three-way junction, as shown. Three-way junctions can have the benefit of being less prone to casting defects as compared to, for example, four-way junctions. Furthermore, inner annular rib 250 does not comprise any junctions, and therefore is not prone to the defects that can occur when casting junctions. As shown, an elbow 386 can be formed at the intersection of each outer rib segment 286 and corresponding inner rib segment 288 to define the obtuse angle α therebetween. Each of the outer and inner rib segments 286,288 can define a substantially rectangular cross section in the present aspect, though in other aspects, the outer and/or inner rib segments 286,288 can define any other suitable shape. Furthermore, the left and right lower connector ribs 284,285 can be formed substantially the same as the left and right upper connector ribs 282,283.

According to example aspects, as shown, the upper stem block 170 can generally define a cube shape. In the present aspect, the upper stem block 170 can comprise three vertical upper sidewalls 372 extending generally upward from the outer rib surface 222 (shown in FIG. 2) of the first end rib 216 and can further define one open side 374. As shown, the upper stem block 170 can also define a substantially horizontal upper top wall 376, relative to orientation shown, through which the upper stem opening 172 can be formed. In other aspects, the upper stem block 170 can define any other suitable shape, including, but not limited to, a rectangular, cylindrical, or triangular shape. Moreover, in the present aspect, the lower stem block 290 can define a pair of spaced, substantially vertical lower sidewalls 392 and a substantially horizontal lower cross-wall 394 extending therebetween, relative to the orientation shown. Each of the vertical lower sidewalls 392 can extend between the inner rib surface 324 of the first end rib 216 and the upper portion 270 of the outer annular rib 260. The lower stem opening can be formed through the horizontal lower cross-wall 394, as shown.

Figure 4:
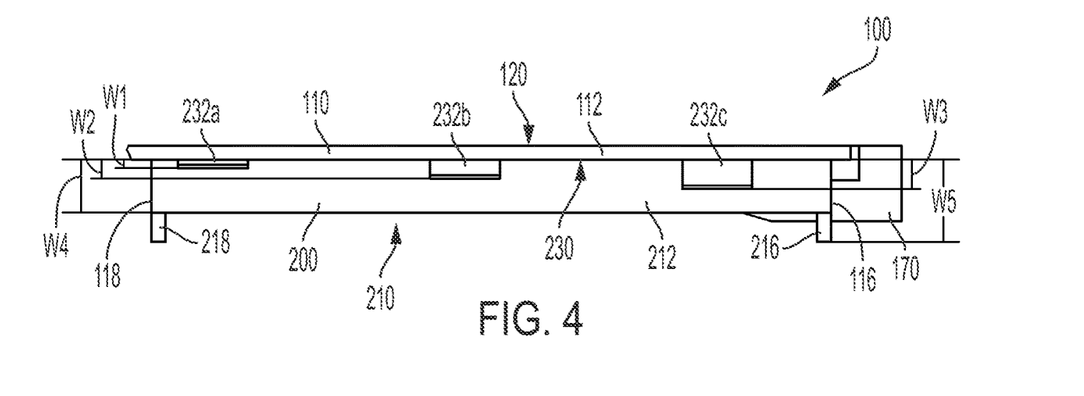
FIG. 4 is a side view of the slide gate of FIG. 1A.

FIG. 4 illustrates a side view of the slide gate 100, showing the first lateral end 112 of the gate body 110 and the first side rib 212 of the exterior rib frame 210. In the present aspect, the slide gate 100 can define three of the first side wedge pads 232 and three of the second side wedge pads 234 (shown in FIG. 2). However, in other aspects, the slide gate 100 can define more for fewer first and second side wedge pads 232,234. According to example aspects, a lower one of the first side wedge pads 232a can define a first width $W_1$, a middle one of the first side wedge pads 232b can define a second width $W_2$, and an upper one of the first side wedge pads 232c can define a third width $W_3$. As shown, in example aspects, the first width $W_1$ can be less than the second width $W_2$, and the second width $W_2$ can be less than the third width $W_3$. The first, second, and third widths W1, W2, W3 of the wedge pads 232a,b,c, respectively, can be staggered to prevent interference with the corresponding frame wedge blocks 540 (shown in FIG. 5) of the gate frame 510 (shown in FIG. 5) as the slide gate 100 moves between the closed and open orientations. Furthermore, in some aspects, each of the first side rib 212 and second side rib 214 (shown in FIG. 2) can define a fourth width $W_4$, which can be less than a fifth width $W_5$ of each of the first and second end ribs 216,218. In example aspects, the first side wedge pads 232 and second side wedge pads 232 (shown in FIG. 2) can provide added reinforcement to the slide gate proximate to the first and second lateral ends 112,114, respectively, thereof. It can be desirable to also provide added reinforcement for the gate body 110 at the upper and lower ends 116,118 thereof. According to example aspects, the increased fifth width $W_5$ of the first and second end ribs 216,218, as compared to the fourth width $W_4$ of the first and second side ribs 212,214, can be configured to provide added reinforcement to the slide gate 100 proximate to the upper and lower ends 116,118 thereof.

FIG. 5 illustrates a slide gate assembly 500, according to example aspect of the present disclosure. As shown, the slide gate assembly 500 can comprise the slide gate 100 slidably mounted to the gate frame 510. The slide gate assembly 500 can be mounted in a channel or trench connected to a dam, water and sewage treatment plant, flood control project, power plant, fish hatchery, or the like. Example aspects of the gate frame 510 can comprise a first side frame member 512 and a second side frame member 514 opposite the first side frame member 512. The gate frame 510 can further comprise an upper end frame member, such as a first end frame member 516, and a lower end frame member, such as a second end frame member 518, opposite the first end frame member 516. Each of the first and second side frame members 512,514 can be substantially vertically oriented, relative to the orientation shown, and each of the first and second end frame members 516,518 can be substantially horizontally oriented relative to the orientation shown. The gate frame 510 can further comprise one or more slides 520, for example, first and second slides 522,524, respectively. In example aspects, the first slide 522 can be substantially vertically oriented and mounted to (or monolithically formed with) the first side frame member 512, and the second slide 524 can be substantially vertically oriented, relative to the orientation shown, and mounted to (or monolithically formed with) the second side frame member 514.

As shown, the first slide 522 can define the first gate frame seating face 526, extending substantially along a length thereof, and the second slide 524 can define the second gate frame seating face 528, extending substantially along a length thereof. In example aspects, similar to the first gate body seating face 123 (shown in FIG. 1B) and second gate body seating face (not shown) described above, each of the first and second gate frame seating faces 526,528 can be formed by a material, such as bronze, impacted into a dovetail groove (not shown) formed in the gate frame 510. According to example aspects, the first gate frame seating face 526 can be configured to slidably engage the first gate body seating face 123 of the gate body 110, and the second gate frame seating face 528 can be configured to slidably engage the second gate body seating face of the gate body 110. The sliding engagement between the first and second gate frame seating faces 526,528 and the corresponding first gate body seating face 123 and second gate body seating face, respectively, can enable the slide gate 100 to move between the closed orientation, as shown, and the open orientation, as shown in FIG. 6. Furthermore, as described above, the engagement of the first gate body seating face 123 and second gate body seating face with the first and second gate frame seating faces 526,528, respectively, can seal the gate body 110 with the gate frame 510. Moreover, according to example aspects, the upper gate body seating face (not shown) can engage the upper gate frame seating face (not shown) to further seal the gate body 110 with the gate frame 510 in the closed orientation.

According to example aspects, the gate frame 510 can comprise one or more of the frame wedge blocks 540. For example, the frame wedge blocks 540 can comprise three first frame wedge blocks 542 coupled to a second face 513 of the first side frame member 512 proximate to the first lateral end 112 of the gate body 110 and three second frame wedge blocks 544 coupled to a second face 515 of the second side frame member 514 proximate to the second lateral end 114 of the gate body 110. Each of the first and second frame wedge blocks 542,544 can define a frame wedge face (not shown). In some aspects, the first frame wedge blocks 542 and/or the second frame wedge blocks 544 can be cast monolithically with the gate frame 510, while in other aspects, the first and/or second frame wedge blocks 544 can be formed separately and attached thereto. Other aspects can comprise more or fewer first frame wedge blocks 542 and second frame wedge blocks 544, as needed. Each of the first frame wedge blocks 542 and second frame wedge blocks 544 can be vertically spaced along the corresponding first side frame member 512 and second side frame member 514, respectively, as shown.

Example aspects of the slide gate 100 can comprise the first wedge pads and the second wedge pads. A one of the gate wedges 530 can be mounted to each of the first and second wedge pads. For example, the gate wedge 530 can define a tongue (not shown) configured to be received in the vertical slot 236 (shown in FIG. 2) of a corresponding one of the first wedge pads or second wedge pads, and the gate wedge 530 can be fastened thereto by the wedge fastener configured to engage the gate wedge 530 and the wedge pad fastener hole 238. In some aspects, the position of the gate wedge 530 on the corresponding first wedge pad or second wedge pad can be selectively adjustable. Furthermore, each of the gate wedges 530 can define the gate wedge face 632 (shown in FIG. 6) configured to press against the frame wedge face of a corresponding one of the first and second frame wedge blocks 542,544. In some aspects, each of the gate wedge faces 632 and the frame wedge faces can define a sloped surface. Moreover, in some example aspects, the gate wedge faces 632 and/or frame wedge faces can comprise a bronze material. In other aspects, the gate and/or frame wedge faces can comprise any other suitable material known in the art. As the slide gate 100 is moved from the open orientation to the closed orientation, the frame wedge faces can slide relative to and press against the corresponding gate wedge faces 632 to wedge the slide gate 100 between the first and second slides 522,524 of the gate frame 510 and the frame wedge blocks in the closed orientation.

According to example aspects, a one of the upper wedge hooks 582 can be mounted to each of the upper wedge pads 180. Each of the upper wedge hooks 582 can be configured to engage a corresponding upper wedge stirrup 584 on the first end frame member 516 of the gate frame 510 in the closed orientation. The upper wedge hooks 582 can disengage the upper wedge stirrups 584 when the slide gate 100 is moved to the open orientation, as shown in FIG. 6. Additionally, according to example aspects, the slide gate assembly 500 can be configured to be mounted to a structure. More specifically, in some aspects, the slide gate assembly 500 can be configured to be mounted to a wall or a wall thimble. As shown, in the present aspect, the gate frame 510 can define one or more frame fastener openings 550 formed through the first side frame member 512. The gate frame 510 can also define or more of the frame fastener openings 550 formed through the second side frame member 514. For example, as shown, a series of the frame fastener openings 550 can be vertically spaced along each first side frame member 512 and second side frame member 514. Each of the frame fastener openings 550 can be configured to receive a frame fastener (not shown) therethrough to mount the slide gate assembly 500 to the desired structure.

FIG. 6 illustrates the slide gate 100 in the open orientation. In the open orientation, the slide gate 100 can be partially open, as shown, or fully open. The gate frame 510 can define the frame opening 610, which can be uncovered or partially uncovered in the open orientation to allow fluid to flow therethrough. To move the slide gate 100 from the closed orientation to the open orientation, the stem can be operated to slide the slide gate 100 upward, relative to the orientation shown, with respect to the stationary gate frame 510. As described above, the first and second gate frame seating faces 526,528 (first gate frame seating face 526 shown in FIG. 5) can abut and slide against the corresponding first gate body seating face 123 (shown in FIG. 1B) and second gate body seating face (not shown), respectively, to guide the slide gate 100 between the closed and open orientations.

According to example aspects, the gate frame 510 can further comprise a seal 620 attached to the second end frame member 518. The seal 620 can be configured to engage the lower end 118 of the gate body 110 in the closed orientation to create a substantially watertight seal between the gate body 110 and the gate frame 510 at the lower end 118. In some aspects, the seal 620 can be a bulb seal. However, in other aspects, the seal 620 can be any other suitable type of seal known in the art. Furthermore, in other aspects, the seal 620 can be positioned on the gate body 110 at the lower end 118 thereof and can be configured to engage the second end frame member 518 of the gate frame 510. Other example aspects of the slide gate assembly 500 can comprise additional seals, as desired, at any suitable location to further seal the slide gate 100 with the gate frame 510.

According to example aspects, a method of using the slide gate assembly 500 can comprise providing the slide gate assembly 500, wherein the slide gate assembly 500 can comprise the slide gate 100 slidably mounted to the gate frame 510. The slide gate 100 can comprise at least the inner annular rib 250 and the outer annular rib 260. The method can further comprise moving the slide gate 100 relative to the gate frame 510 between the open orientation, wherein fluid is permitted to flow through the frame opening 610 of the gate frame 510, and the closed orientation, wherein fluid is restricted from flowing through the frame opening 610.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A slide gate comprising:
a gate body defining a first face, a second face, and a sliding groove; and
a plurality of reinforcement ribs extending from the second face, the reinforcement ribs comprising:
an exterior rib frame; and
an interior rib grid comprising an annular reinforcement rib, wherein the interior rib grid is oriented within a boundary of the exterior rib frame, and wherein the annular reinforcement rib is inwardly spaced from the exterior rib frame.

2. The slide gate of claim 1, wherein the annular reinforcement rib is connected to the exterior rib frame by a connector rib.

3. The slide gate of claim 2, wherein:
the connector rib defines an outer rib segment coupled to the exterior rib frame and an inner rib segment coupled to the annular reinforcement rib; and
the outer rib segment is oriented at an obtuse angle relative to the inner rib segment.

4. The slide gate of claim 1, wherein the annular reinforcement rib is an outer annular rib and the interior rib grid further comprises an inner annular rib concentric to the outer annular rib.

5. The slide gate of claim 4, wherein the outer annular rib defines a thickness that is greater than a thickness of the inner annular rib.

6. The slide gate of claim 4, wherein:
the outer annular rib is connected to the exterior rib frame by a connector rib; and
the inner annular rib is a floating rib.

7. The slide gate of claim 1, wherein:
the annular reinforcement rib defines a proximal end, a distal end, and a central portion therebetween;
the proximal end is filleted; and
the distal end is filleted.

8. The slide gate of claim 1, wherein:
the gate body defines a first lateral end, a second lateral end, an upper end, and a lower end;
a first side wedge pad is oriented proximate to the first lateral end on the second face;
a second side wedge pad is oriented proximate to the second lateral end on the second face; and
a gate wedge is coupled to each of the first side wedge pad and second side wedge pad, each of the gate wedges defining a gate wedge face.

9. The slide gate of claim 1, wherein each of the reinforcement ribs is formed monolithically with the gate body.

10. The slide gate of claim 1, wherein the exterior rib frame comprises a first side rib, a second side rib, a first end rib, and a second end rib.

11. A slide gate assembly comprising:
a slide gate comprising a gate body, the gate body defining a first face and a second face, an outer annular reinforcement rib extending from the second face, an inner annular reinforcement rib positioned within the bounds of the outer annular rib and extending from the second face; and
a gate frame defining a frame opening, the slide gate slidably mounted on the gate frame, wherein the slide gate is selectively movable relative to the gate frame between an open orientation, wherein fluid is permitted to flow through the frame opening, and a closed orientation, wherein fluid is restricted from flowing through the frame opening.

12. The slide gate assembly of claim 11, wherein:
the slide gate defines a first gate body seating face: and
the gate frame defines a first gate frame seating face configured to slide against the gate body seating face as the slide gate moves between the open orientation and closed orientation.

13. The slide gate assembly of claim 11, wherein:
the slide gate comprises a side wedge pad and a gate wedge mounted to the side wedge pad, the gate wedge defining a gate wedge face;
the gate frame comprises a frame wedge block defining a frame wedge face; and
the gate wedge face presses against the frame wedge face in the closed orientation.

14. The slide gate assembly of claim 11, wherein the inner annular reinforcement rib is concentric to the outer annular reinforcement rib, and wherein the inner annular reinforcement rib is a floating rib.

15. The slide gate assembly of claim 11, wherein:
the slide gate further comprises an exterior rib frame extending from the second face; and
the outer annular reinforcement rib is inwardly spaced from the exterior rib frame and is connected to the exterior rib frame by a connector rib.

16. The slide gate assembly of claim 11, wherein:
the gate frame further defines a lower end frame member and a seal attached to the lower end frame member;
the slide gate defines a lower end; and
the seal is configured to engage the lower end to create a watertight seal between the gate frame and slide gate at the lower end.

17. A method of using a slide gate assembly comprising:
providing the slide gate assembly, the slide gate assembly comprising a slide gate slidably mounted to a gate frame, the slide gate comprising a gate body, an inner annular rib, and an outer annular rib, each of the inner and outer annular ribs extending from the gate body; and moving the slide gate relative to the gate frame between an open orientation, wherein fluid is permitted to flow through a frame opening of the gate frame, and a closed orientation, wherein fluid is restricted from flowing through the frame opening.

18. The method of claim 17, wherein;

the slide gate further comprises an exterior rib frame; and the outer annular rib is connected to the exterior rib frame by a connector rib.

19. The method of claim 17, further comprising pressing a gate wedge face of the slide gate against a frame wedge face of the gate frame in the closed orientation.

20. The method of claim 17, further comprising engaging an upper wedge hook of the slide gate with an upper wedge stirrup of the gate frame in the closed orientation.

\* \* \* \* \*